(12) United States Patent
Willeke et al.

(10) Patent No.: US 6,311,873 B1
(45) Date of Patent: Nov. 6, 2001

(54) AUTOMOTIVE FLUID DISPENSING SYSTEM

(75) Inventors: Robert Willeke, Cocoa, FL (US); Jeffrey M. Eliason, St. Paul; Dale A. Severson, Eagan, both of MN (US)

(73) Assignee: Clean Shield Enterprises, Inc., Eagan, MN (US)

( * ) Notice: Subject to any disclaimer, the term of this patent is extended or adjusted under 35 U.S.C. 154(b) by 0 days.

(21) Appl. No.: 09/634,489

(22) Filed: Aug. 8, 2000

Related U.S. Application Data (63) Continuation of application No. 09/316,828, filed on May 21, 1999, now Pat. No. 6,230,939.

(51) Int. Cl.[7] .................................................. B67D 5/64
(52) U.S. Cl. ........................ 222/173; 222/571; 137/234.6
(58) Field of Search .................................. 222/571, 173, 222/181.1, 158; 137/234.6

(56) References Cited

U.S. PATENT DOCUMENTS

| | | | |
|---|---|---|---|
| 2,021,544 | * 11/1935 | Crown ................................... | 222/571 |
| 4,901,748 | * 2/1990 | Shotmeyer .......................... | 137/234.6 |
| 4,986,446 | * 1/1991 | Montgomery et al. .............. | 222/173 |

* cited by examiner

Primary Examiner—Philippe Derakshani
Assistant Examiner—Thach H. Bui
(74) Attorney, Agent, or Firm—Fredrikson & Byron, P.A.

(57) ABSTRACT

A system for automated vending of automotive fluid such as windshield washer fluid from large volume tanks. In one embodiment the system includes two or more vending control units and a fluid storage system that includes one or more fluid storage tanks mounted at a level above the vending control units. Preferably the fluid storage tanks are mounted to an over head canopy, either on the roof of the canopy or on one of the canopy support columns. Where two or more fluid storage tanks are utilized, fluid equalization conduits connect the storage tanks to each other so that fluid levels in the storage tanks equalize as fluid is added to or withdrawn from any one of the tanks. Two or more fluid dispensing hoses are provided, each one being associated with and controlled by one of the vending control units. Each hose is connected to the fluid storage system and dispenses fluid by force of gravity in response to selective activation of the corresponding vending control unit by a user. Preferably the distal end of the fluid dispensing hose has a dispensing nozzle, a controllable dispensing valve located upstream from the dispensing nozzle, and a check valve disposed between the dispensing valve and the end of the nozzle. The check valve permits fluid to flow toward the nozzle when a pressure differential across the check valve exceeds a predetermined value. Thus, when the upstream dispensing valve is opened, the fluid pressure across the check valve exceeds the predetermined value, opening the check valve and permitting fluid to be dispensed.

24 Claims, 10 Drawing Sheets

AUTOMOTIVE FLUID DISPENSING SYSTEM

This application is a continuation of application Ser. No. 09/316,828, filed May 21, 1999, now U.S. Pat. No. 6,230,939.

TECHNICAL FIELD

The invention relates to a system for the automated dispensing of windshield washer fluid and other automotive fluids, such as radiator coolant or oil, at locations convenient to consumers, such as service stations.

BACKGROUND OF THE INVENTION

Windshield washer fluid, and other automotive fluids, such as radiator coolant or engine oil, typically are sold in plastic jugs of a size convenient to the consumer. In the case of windshield washer fluid, such jugs typically contain a gallon of fluid, and currently sell at a retail price of roughly $1.25 per gallon (slightly more in some places, slightly less in others). Such fluid is relatively cheap to produce—typically it consists simply of a water/methanol mixture, with about 10–35% methanol, depending on the climate in which the product is sold (the higher methanol percentage is desirable in colder climates). Thus, a significant portion of the retail cost of windshield washer fluid lies in the cost of producing, filling and capping the plastic jug, and transportation costs associated with distribution and handling of the plastic jugs.

In the northern states which have snowy climates, retail sales of windshield washer fluid can be extremely erratic, being highly dependent upon weather conditions. Road spray on highways during and after a snowfall, particularly on roads that have been salted and sanded by highway crews, can cause motorists to use fairly large quantities of fluid in a short amount of time. The spring melting of snow along highways can also give rise to dirty road spray. These types of weather conditions create spikes of demand for windshield washer fluid, as motorist in some weather conditions may actually need to use a squirt of washer fluid every mile or even half-mile. In contrast, very cold and dry conditions, or consistently warm and dry conditions, do not give rise to such high levels of demand.

Although retail outlets of all types sell windshield washer fluid, service stations in particular sell large quantities of this fluid during the winter months in northern states. Some service stations can sell hundreds of gallons per day in certain weather conditions. Yet, retail "floor space," whether indoors or out, is usually fairly limited in such service stations. Thus, the stocking of service stations with gallon jugs of windshield washer fluid becomes a labor intensive, challenging job, as demand can be very heavy for a few days or weeks, and then very light for until weather conditions again cause high demand. Yet, it is very important for retailers, particularly service stations, to not run out of fluid during high demand days, as a very large portion of annual sales of windshield washer fluid occur on a proportionately small number of such days.

Other areas of the country experience similar erratic demand cycles for windshield washer fluid. In some states there are seasonal periods during which bugs are an inordinate problem. For example, Florida typically has a bug season of about one month in duration both spring and fall; during those seasons windshields become regularly fouled with particularly messy bugs, creating a much larger than normal demand for windshield washer fluid. Thus, in these periods of time the high demand for windshield washer fluid creates inventory control challenges.

In addition to the challenges of cost-effective inventory control for such automotive fluids, the use of plastic jugs to distribute such fluid creates environmental disposal concerns. Even though windshield washer fluid is mostly water, the plastic gallon jugs in which the fluid is sold generally are not re-usable. Thus, each year large numbers of such jugs must be either land-filled or, where available, recycled.

Self-service vending of automotive fluids from a coin-operated dispensing unit has been proposed for certain applications. For example, U.S. Pat. No. 5,497,914 shows a car care self-service device designed to dispense small quantities of a number of different types of cosmetic car care fluids, such as engine cleaner, rubber cleaner, windshield and glass cleaner, windshield washer fluid, upholstery cleaner, air fresheners, or the like. The user inserts in a predetermined amount of money, and then selects which type of fluid is desired. A corresponding hose/nozzle is then activated to permit the user to dispense a small quantity of the chosen fluid. This vending unit is mounted on casters, so that it can be rolled around, and, thus, while the system is capable of dispensing measured amounts of various types of fluids, the system plainly is not designed to handle the relatively enormous volume of windshield washer fluid (e.g., hundreds of gallons) that a typical service station might sell on a particularly high-demand day.

SUMMARY OF THE INVENTION

The invention provides a solution to the high package and handling cost, inventory control and environmental problems associated with the conventional plastic jug method of distributing automotive fluids such as windshield washer fluid, antifreeze, oil and the like. The system utilizes automated vending concepts that are convenient to the consumer, in combination with a storage and dispensing system that facilitates convenient storage of large quantities of windshield washer fluid without taking up valuable retail "floor space" (whether indoors or out).

In one embodiment the system includes two or more vending control units and a fluid storage system that includes two or more fluid storage tanks mounted at a level above the vending control units. One or more fluid equalization conduits are provided to connect the storage tanks to each other so that fluid levels in the storage tanks are able to equalize as fluid is added to or withdrawn from any one of the tanks. Two or more fluid dispensing hoses are provided, each one being associated with and controlled by one of the vending control units. Each fluid dispensing hose has a proximal end connected to the fluid storage system and a distal end from which fluid may be dispensed by force of gravity in response to selective activation of the corresponding vending control unit by a user. Preferably the fluid storage tanks are mounted to an overhead canopy, either on the roof of the canopy or on one of the canopy support columns. In another embodiment, the system includes an overhead canopy including a roof portion and two or more columns supporting the roof portion, two or more fluid vending control units, each such fluid vending control unit being mounted to a different one of the columns, and a fluid storage system. The fluid storage system includes one or more fluid storage tanks at least partially filled with windshield washer fluid, and a fluid dispensing hose associated with and controlled by each vending control unit. Each fluid dispensing hose has a proximal end connected to the fluid storage system and a distal end from which fluid may be dispensed in response to selective activation of the corresponding vending control unit by a user. Preferably at least a portion of the fluid storage system is mounted to the canopy, either on the roof of the canopy or on one of the canopy support columns.

In yet another embodiment, the system includes a fluid vending control unit, a fluid storage tank mounted remotely from and at a level above the fluid vending control unit, and a fluid dispensing hose connected to the storage tank at a position that permits fluid to flow from the storage tank into the hose by force of gravity. The fluid dispensing hose has a dispensing nozzle with a dispensing end, a controllable dispensing valve located upstream from the dispensing nozzle, and a check valve disposed between the dispensing valve and the dispensing end of the nozzle. The check valve is configured to permit fluid to flow through the check valve toward the nozzle when a pressure differential across the check valve exceeds a predetermined value. Thus, when the upstream dispensing valve is opened (as by activation from the vending control unit), the fluid pressure across the check valve exceeds the predetermined value, opening the check valve and permitting fluid to be dispensed. When the upstream dispensing valve is closed, the pressure differential drops, causing the check valve to close. The check valve thus keeps the hose full of fluid between customer uses of the system while permitting gravity to be effectively utilized in the system.

DETAILED DESCRIPTION OF THE INVENTION

Figure 1:
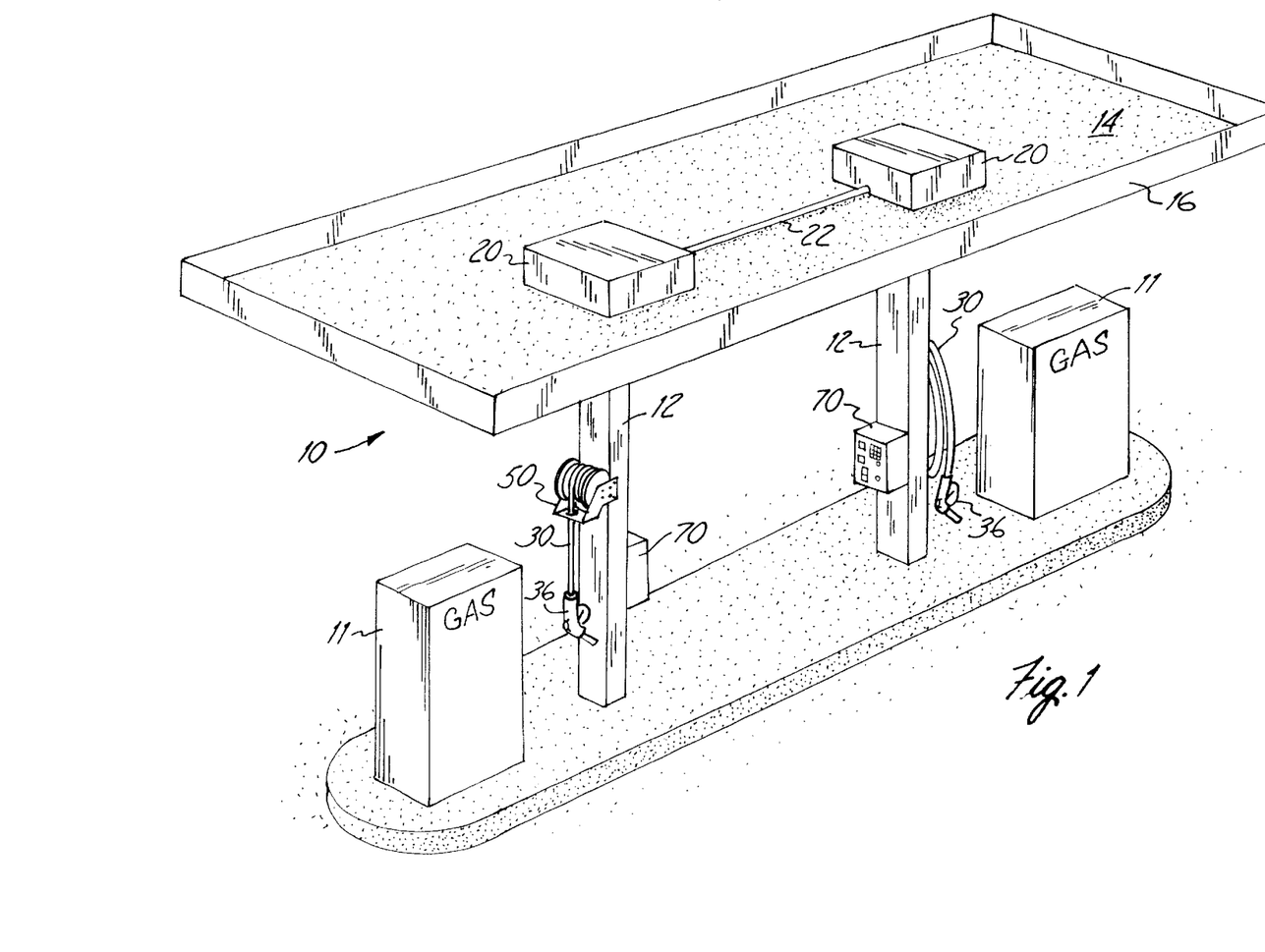
FIG. 1 is a perspective view of a gas station island and canopy outfitted with the windshield washer fluid dispensing system of the invention.

FIG. 1 depicts one preferred embodiment of a system for dispensing windshield washer fluid. The system is installed on the canopy 10 of a gas station island. The canopy, of course, provides a modicum of protection from the elements for the gas pumps 11 and for customers filling up with gas. The canopy 10 depicted in the drawings is shown as having a generally flat roof portion 14 supported by a two columns 12. This drawing is merely illustrative, however, as the system of the invention can be installed on canopies of other configurations, including canopies having more than two columns, and canopies having roof portions of other configurations (e.g., pitched roofs, etc.).

Figure 2:
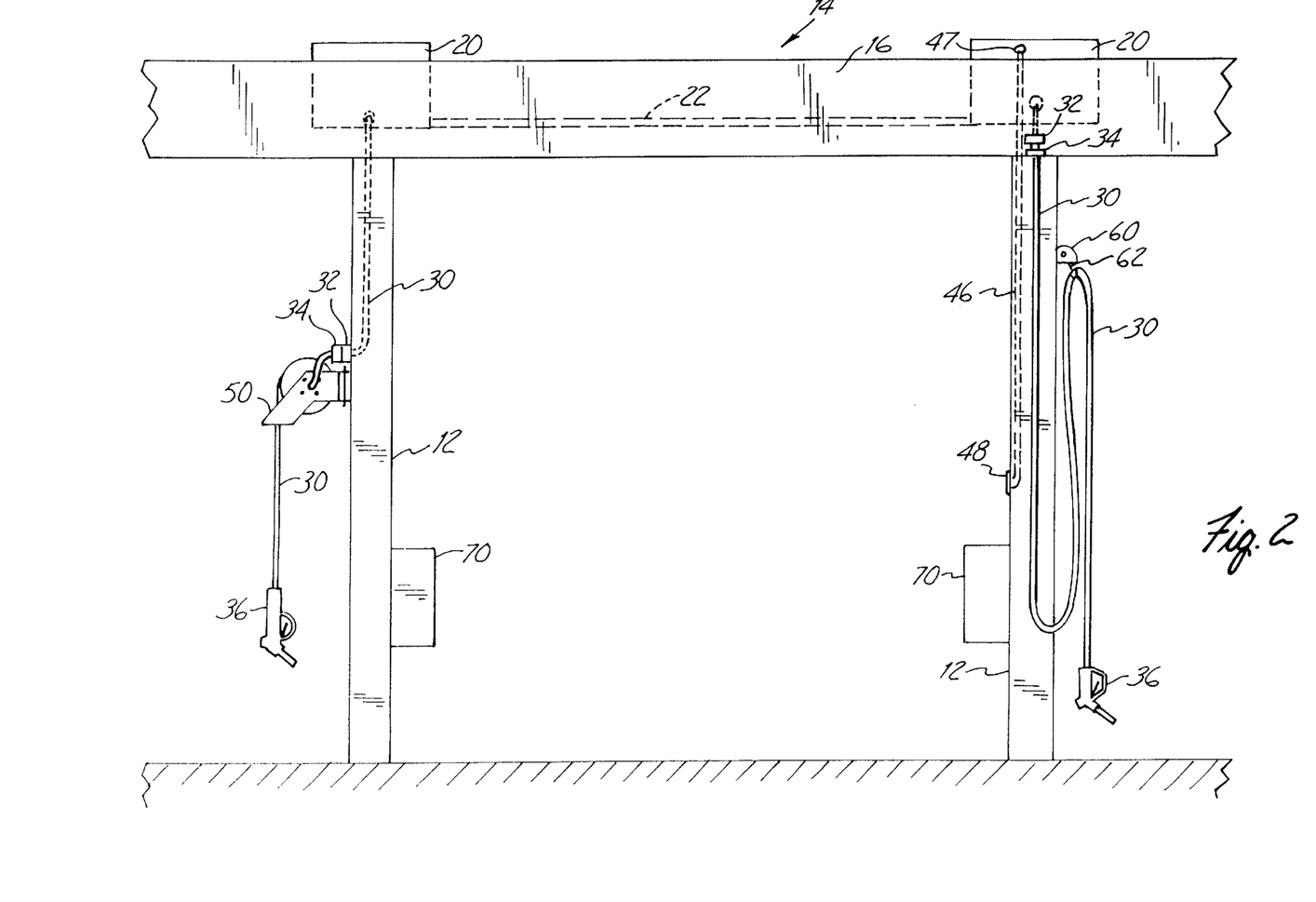
FIG. 2 is an elevation view of the windshield washer fluid dispensing system of FIG. 1.

This embodiment of the invention relies on gravity to help deliver the windshield washer fluid to the customer, thereby eliminating the need for pumps. The fluid storage system includes a pair of elevated fluid storage tanks 20 connected by a fluid equalization conduit 22 so that fluid levels in the storage tanks 20 are able to equalize as fluid is added to or withdrawn from either one of the tanks. Although the drawings show two tanks 20 mounted over two support columns 12, more tanks can be utilized, particularly on larger canopies having more support columns. As is described further below, desirably one tank 20 is placed on the roof above each support column 12.

This configuration for the fluid storage system provides several advantages. First, by providing multiple tanks 20, the total storage capacity of the system can be significant, without requiring a large tank. Several smaller tanks 20, connected by equalization conduits 22, can provide the necessary capacity without requiring any one tank 20 to be too large. FIG. 2 shows two smaller tanks 20 on the roof 14 of the canopy, the tanks 20 being small enough to be mostly hidden from view by the fascia 16. A single larger tank would be more visible and, therefore, less desirable. Using several smaller tanks also facilitates weight distribution on the canopy. As is shown in FIGS. 1–2, each of the tanks 20 is located directly above one of the canopy columns 12, alleviating the need to add any reinforcement to the roof portion 14, and yet evenly distributing the weight of the fluid storage system over both columns. Tank sizes preferably are at least about 50 to 100 gallons, and for some installations desirably may be as much as 300 gallons or more. Two particularly preferred sizes are 120 gallons and 200 gallons.

Fluid dispensing hoses 30 are provided for dispensing windshield washer fluid from the fluid storage system. Each fluid dispensing hose 30 has a proximal end connected to the fluid storage system. That connection can be anywhere in the fluid storage system, but preferably is a connection directly to one of the tanks 20. Alternately, the dispensing hose 30 could be connected to a fluid equalization conduit 22, or at any other suitable location within the fluid storage system. Each dispensing hose 30 also includes a distal end from which fluid may be dispensed, as described below in connection with FIG. 3

Any of a variety of systems may be employed for managing the dispensing hoses 30 when not in use. The drawings depict two such systems. On the left column 12 in FIGS. 1–2 a proximal portion of the dispensing hose (shown in phantom lines) is disposed within the support column 12, and the remainder of the hose 30 is managed by a retractable hose reel. On the right column 12 in FIGS. 1–2 the fluid dispensing hose comes down through the roof portion 14 of the canopy in a position such that it is not confined within the canopy column. The hose 30 hangs in a loop, and is managed by a hose retractor 60. The retractor 60 includes an automatically retractable cable 62 that is connected to the hose 30 at an intermediate location such that the nozzle 36 does not drag on the ground when the cable is fully retracted. Other suitable mechanisms may also be provided for managing the fluid dispensing hoses 30; in some installations, the hose may simply be hung in a single loop, without requiring any additional hose management mechanism The windshield washer fluid dispensing system of the invention also includes a vending control unit 70 (described in greater detail below) to control the dispensing of fluid from the dispensing hoses 30. Preferably a vending control unit 70 is provided for each of the fluid dispensing hoses 30, the control units being mounted to the corresponding support columns 12, typically at a level below the fluid storage system. Although a variety of control mechanisms could be utilized, in the embodiment shown in FIGS. 1–2 each control unit 70 is electrically connected to a flow meter 32 and a controllable dispensing valve (such as a solenoid valve) 34 disposed at some position in (or at the proximal end of) the fluid dispensing hose 30. When the vending control unit 70 receives the necessary input (as, e.g., from the customer dropping in the required coins or tokens, or inputting a predetermined code), the control unit 70 opens the solenoid valve 34 to permit fluid flow from the fluid storage system (typically from one of the storage tanks 20) into the fluid dispensing hose 30. In the configuration shown on the left side of FIG. 2, the flow meter 32 and the valve 34 are located adjacent to the hose reel 50; in the configuration shown on the right side of FIG. 2, the flow meter 32 and the valve 34 are located near the proximal end of the hose 30, adjacent to one of the storage tanks 20. Any other suitable location may also be employed. If desired, a filter may also be disposed in the hose 30 at a convenient location.

A variety of fluid flow control devices can be utilized to control the amount of fluid dispensed. For example, one could use a timer to simply leave the solenoid valve 34 open for a predetermined amount of time ("all the fluid you can use in 45 seconds"). Preferably, however, a flow meter 32 is provided in the fluid dispensing hose (or near the proximal end of the hose 30) to measure out a predetermined amount of fluid corresponding to the amount paid for by the customer (e.g., $ 1.00 for three quarts, a common amount needed to fill the windshield washer fluid tanks in many vehicles). The flow meter 32 thus monitors the amount of fluid dispensed, and, once the predetermined amount has been dispensed, the vending control system 70 shuts off the fluid by closing the solenoid valve. Other suitable fluid flow devices may also be utilized.

Figure 3:
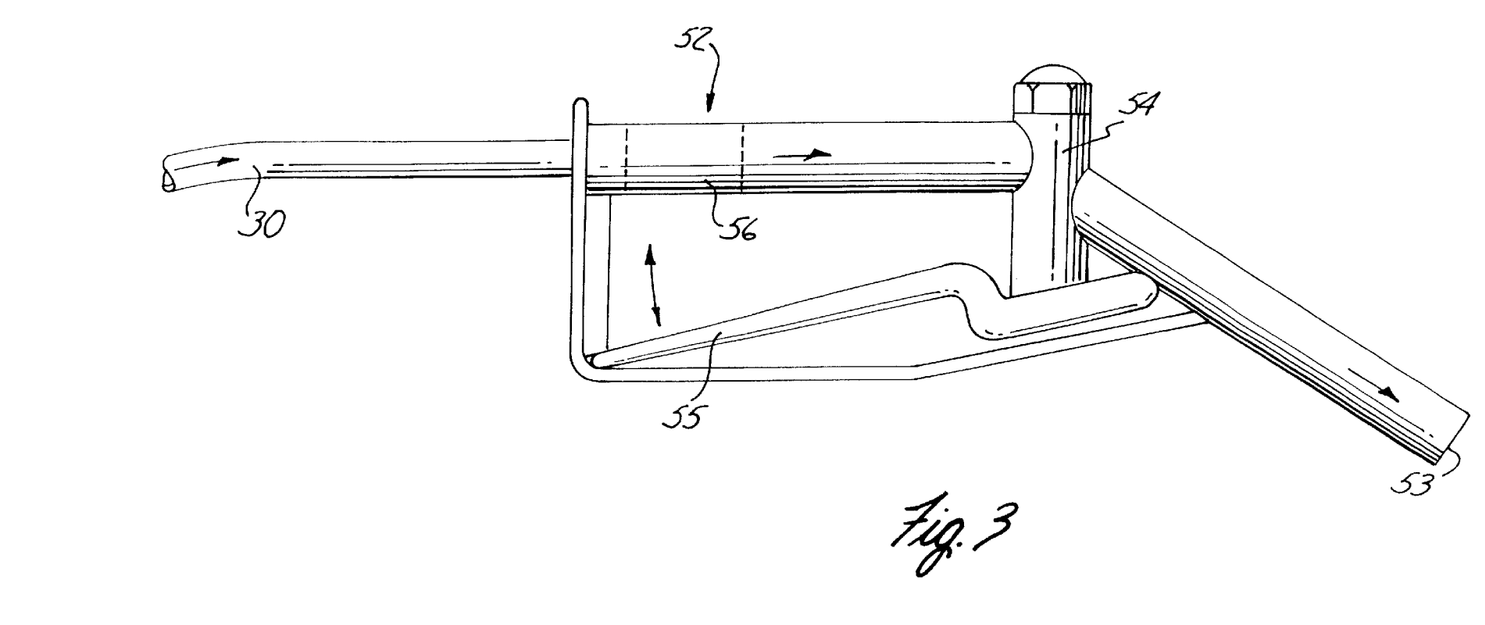
FIG. 3 is an enlarged view of a dispensing nozzle on the end of the fluid dispensing hose of the invention.

FIG. 3 illustrates a preferred embodiment of the distal end of a fluid dispensing hose 30, including a fluid dispensing nozzle 52. The nozzle 52 includes a dispensing end 53, a control valve 54, a control lever 55, and a check valve 56 located upstream from the dispensing end 53 of the nozzle. Activation of the lever 55 opens the control valve 54 to permit fluid to be dispensed. The check valve is provided to prevent the user from emptying the entire dispensing hose 30 of fluid, either purposely or inadvertently, after the user has dispensed the entire quantity of fluid purchased (i.e., after the solenoid valve 34 is closed by the vending control unit 70). The check valve 56 is configured to permit fluid to flow through the check valve toward the dispensing end 53 of the nozzle 52 when a pressure differential across the check valve 56 exceeds a predetermined value. Applicants have found that for systems relying on gravity to dispense the fluid, the predetermined value desirably is within the range of about 0.1–0.5 psi, and preferably in the range of about 0.2–0.3 psi. Thus, so long as both the solenoid valve 34 and the nozzle control valve 54 are open, the pressure across the check valve will exceed the predetermined value, causing the check valve 56 to open. When the solenoid valve 34 closes, however, then the pressure across the check valve 56 drops, closing this valve 56 and stopping the flow of fluid into the nozzle 52. In FIG. 3 the check valve 56 is depicted as being mounted in the nozzle upstream from the control valve 54; if desired, however, the check valve 56 could also be located downstream from the control valve 54.

In the embodiment of FIGS. 1–2, as indicated above, the fluid storage tanks 20 are mounted on top of the roof portion 14 of the canopy 10. For convenience in filling the tanks 20, a fluid supply conduit 46 is provided. The supply conduit 46 preferably has a first end 47 connected to one of the elevated fluid storage tanks 20 and a second end 48 accessible at ground level for connection to a supply tank. Preferably the second end 48 of the supply conduit 46 includes a standard quick connect fitting with a check valve. With such an arrangement a fluid delivery truck carrying a fluid supply tank can easily connect up to the quick connect fitting on the second end 48 of the supply conduit 46, pump the desired amount of fluid up the supply conduit 46 until the tanks 20 are sufficiently full, and then disconnect from the second end 48 of the supply conduit 46. The check valve in the quick connect fitting prevents fluid in the supply conduit 46 from draining out when the supply tank is disconnected.

A fluid level sensor 49 (shown schematically in FIG. 12) may be provided in one or more of the storage tanks 20 to provide an indication of the level in the tanks 20. Such a device is useful for indicating when the tanks need to be refilled, as well as for indicating when the tanks reach their full condition as fluid is pumped up into them from the fluid supply tank.

FIGS. 4–7 illustrate one embodiment of a vending control unit 70. This embodiment has a housing 71 constructed from a length of generally hollow square steel tubing having cross-sectional dimensions of, e.g., about 10"×10". Top 88 and bottom 89 panels are locked to the housing 71 by a suitable mechanism that conveniently permits their removable by authorized service personnel, while providing the necessary security against vandalism. In the preferred embodiment shown in the drawings, a locking tab 86 (which is secured to the housing 71) protrudes through each of the top 88 and bottom 89 panels. The tab includes a lateral hole through which a padlock or other suitable locking mechanism may be secured. One particularly preferred lock is the Model 2000 shackleless padlock available commercially from American Lock Company (Crete, Ill.). Other types of locking mechanisms may also be utilized. Lock protection collars 84 may be welded onto the top 88 and bottom 89 panels to discourage vandalism.

Figure 4:
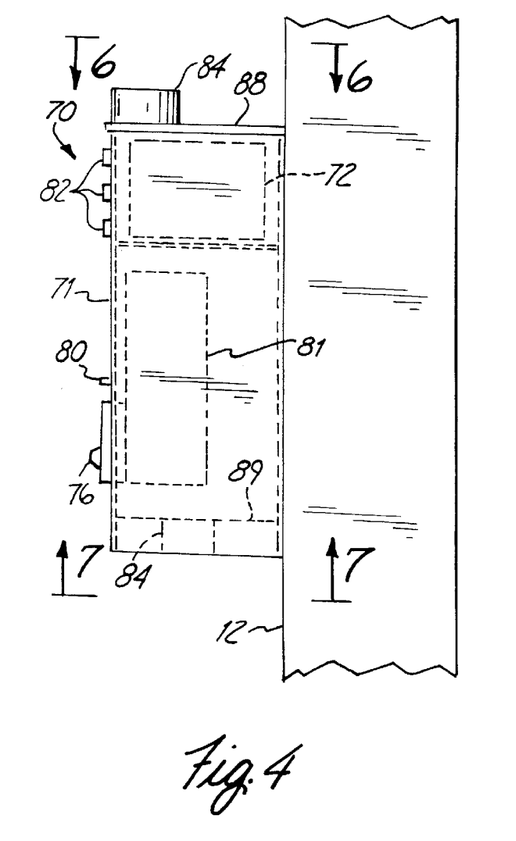
FIG. 4 is a broken-away side view of the vending control unit of the windshield washer fluid dispensing system of FIG. 1.
Figure 5:
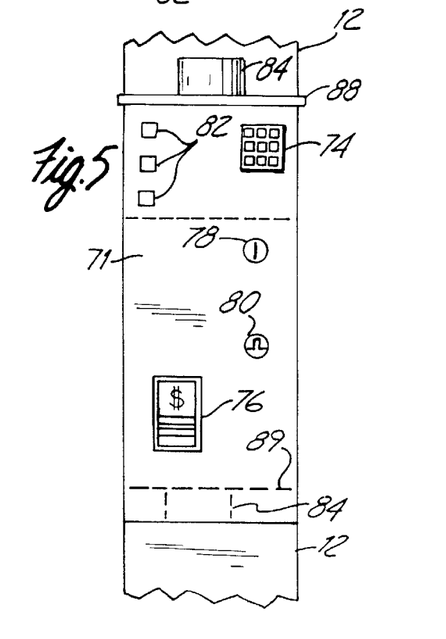
FIG. 5 is a front view of the vending control unit of FIG. 4.
Figure 6:
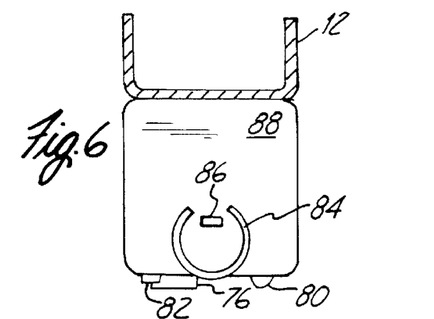
FIG. 6 is a top view of the vending control unit of FIG. 4.
Figure 7:
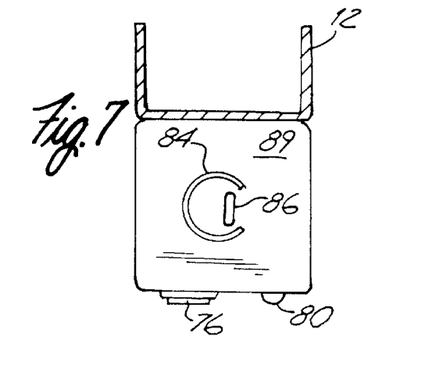
FIG. 7 is a bottom view of the vending control unit of FIG. 4.

A system controller 72 is mounted within the housing 71. The system controller may be any suitable device capable of controlling the dispensing of fluid in response to a customer purchase. Thus, the controller can be quite rudimentary, if desired. Alternately, the controller may also be capable of providing more sophisticated functions, such as diagnostics of the operation of the entire system, and remote dial-up or another suitable communications link to report such things as operational condition, the amount of fluid in the fluid storage system, sales volume, unauthorized access, and the like. For these purposes, the system controller 72 may be comprised of a general purpose computer, a programmable logic controller, a custom built simple discrete controller, an advanced embedded controller, or any other suitable controller that provides the desired functionality. Moreover, while fully functional controllers may be provided within each of the multiple vending control units 70, preferably one of the vending control units is a master unit containing a fully functional controller, while other vending control units within a particular installation are simply slave units capable of receiving payment (and/or being activated by the customer) and reporting to the master unit.

The system controller 72 is electronically connected to a payment/activation customer interface. Any of a variety of such interfaces could be provided. For example, a person purchasing gas could pay the gas station attendant for windshield washer fluid and receive a unique code to be inputted on a keypad 74 on the vending control unit 70, much in the way that many service station car washes are controlled. For customer convenience, however, preferably the interface permits the customer to purchase fluid right at the vending control unit 70. While this could be accomplished through, e.g., self-service credit or debit card systems, given the fact that most purchases will be only on the order of about $0.75–1.50, a traditional cash vending system is particularly preferred. Such system may include a conventional dollar bill mechanism 76 along with a conventional coin mechanism having a coin insert 78 and a coin return 80. Money received is stored in a cash vault 81, which may be accessed through authorized removal of the bottom plate 89. Selection buttons 82 may be provided to permit the customer to select from various purchase options (typically the selections would simply be different volumes of fluid).

Figure 8:
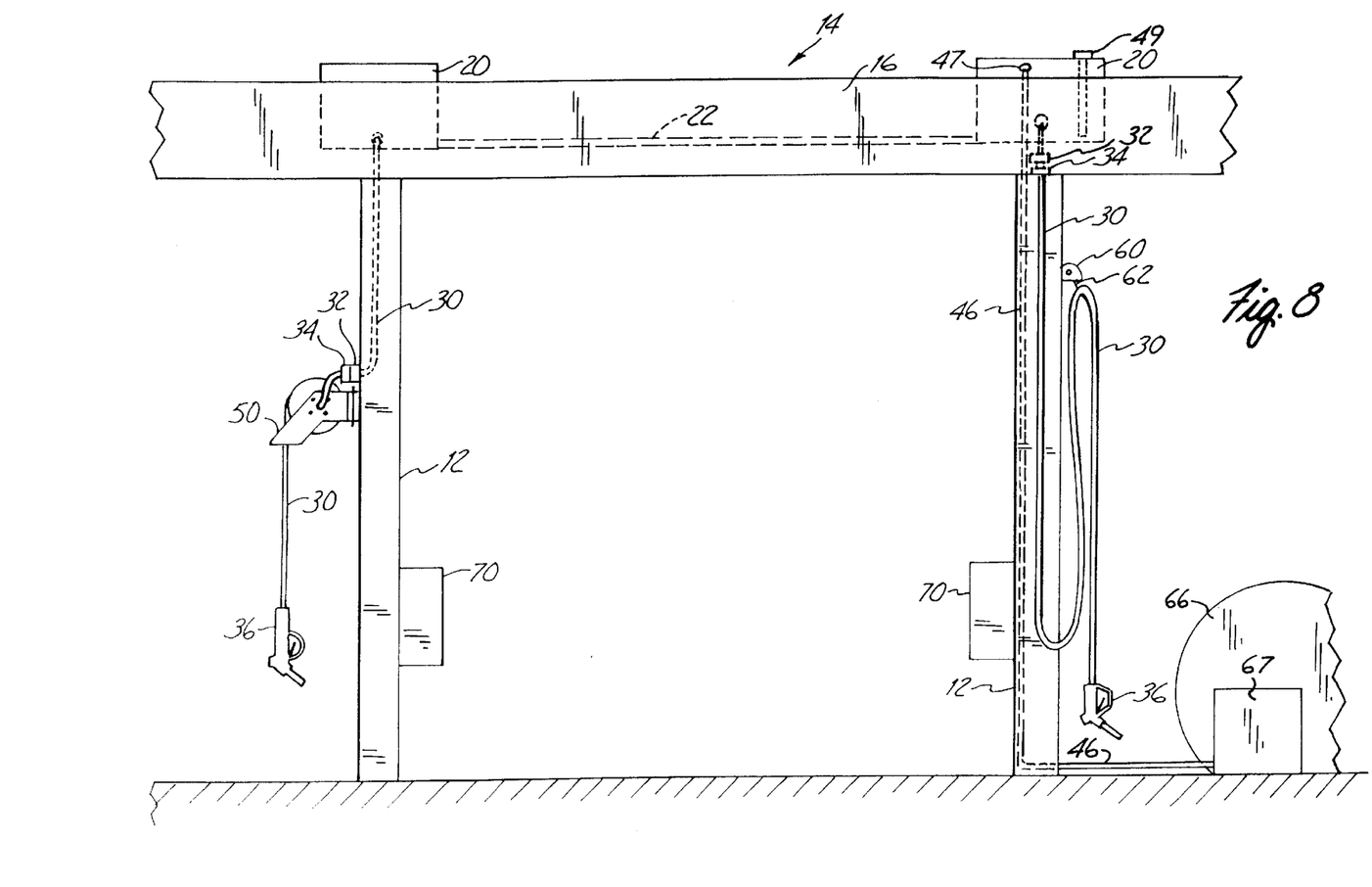
FIG. 8 is an elevation view of an alternate embodiment of the windshield washer fluid dispensing system of the invention.

FIG. 8 illustrates a modified embodiment of the invention. In this embodiment a bulk storage tank 66 is provided at a level below the elevated fluid storage tanks 20 (typically the bulk storage tank 66 would be, as shown in the drawing, at ground level, though, unlike the somewhat schematic drawing, located at a position somewhat remote from the canopy). A pump 67 is connected to the tank 66 and to the supply conduit 46, and fills the elevated storage tanks 20 from the bulk tank 66 as needed. Automatic filling of the elevated tanks 20 can be achieved through connection of the pump 67 to the system controller in the vending control unit 70 and use of a suitable fluid level sensor 49 in one or more of the elevated tanks 20.

Figure 9:
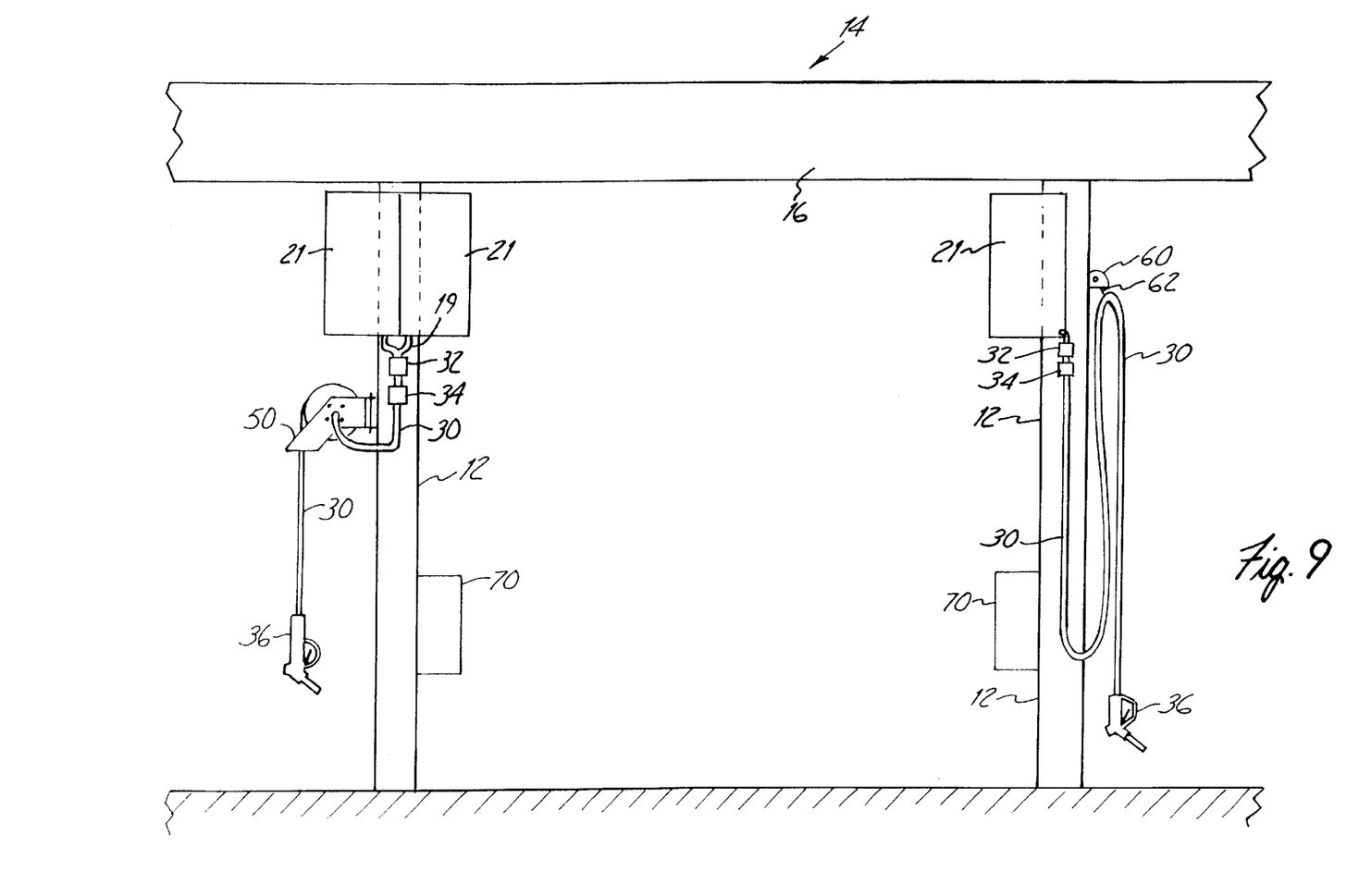
FIG. 9 is an elevation view of another alternate embodiment of the windshield washer fluid dispensing system of the invention.

FIG. 9 illustrates another modified embodiment of the invention. In this embodiment the elevated fluid storage tanks 21 are mounted to the canopy columns 12 at a position below the roof portion 16 of the canopy. The tanks 21 are nevertheless in an elevated position above the vending control units 70 so that fluid may be dispensed from the tanks using gravity. Note that the right hand column 12 in FIG. 9 has a single tank 21 mounted to the column 12, while the left hand column 12 has a pair of tanks 21 mounted side by side. In the side by side configuration, the two tanks are connected to each other through a short fluid equalization conduit 19, and the fluid dispensing hose 30 is in turn connected to this fluid equalization conduit 19 rather than being connected directly to one of the tanks 21. Alternately, the fluid dispensing hose 30 could be connected independently to one of the tanks 21.

Figure 10:
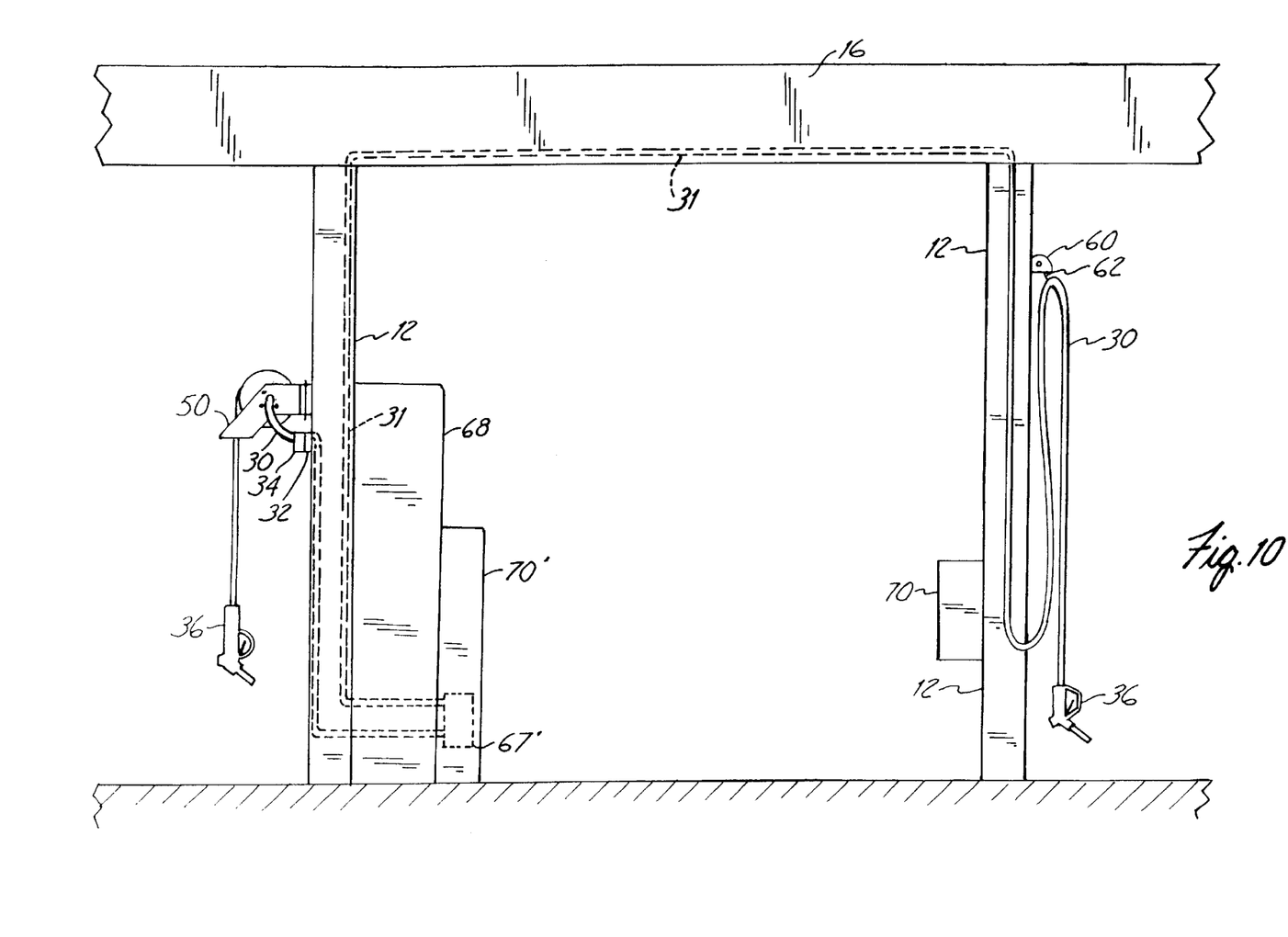
FIG. 10 is an elevation view of yet another alternate embodiment of the windshield washer fluid dispensing system of the invention.

FIG. 10 illustrates yet another modified embodiment of the invention. In this embodiment two or more fluid vending control units 70 and 70' are positioned remotely from one another, and the fluid storage tank 68 is mounted at a level below the roof portion 14 of the canopy. The fluid storage system includes a fluid pump 67' disposed within the base portion of a modified version one of the vending control units 70' (of the type depicted in FIG. 11). Preferably the pump 67' is located at least about 18" above the ground. A fluid delivery conduit 31 is provided, the conduit having first and second ends and an intermediate portion. The first end of the conduit 31 is connected to the pump 67' and a the second end is connected to one of the fluid dispensing hoses 30. The intermediate portion of the conduit 31 extends up one of the canopy columns 12 and across the canopy roof portion 14 to its point of connection with the fluid dispensing hose 30. Although a variety of fluid storage tanks could be used in this embodiment, a tank of approximately two feet in diameter and eight feet tall will yield a capacity of about 120 gallons.

Figure 11:
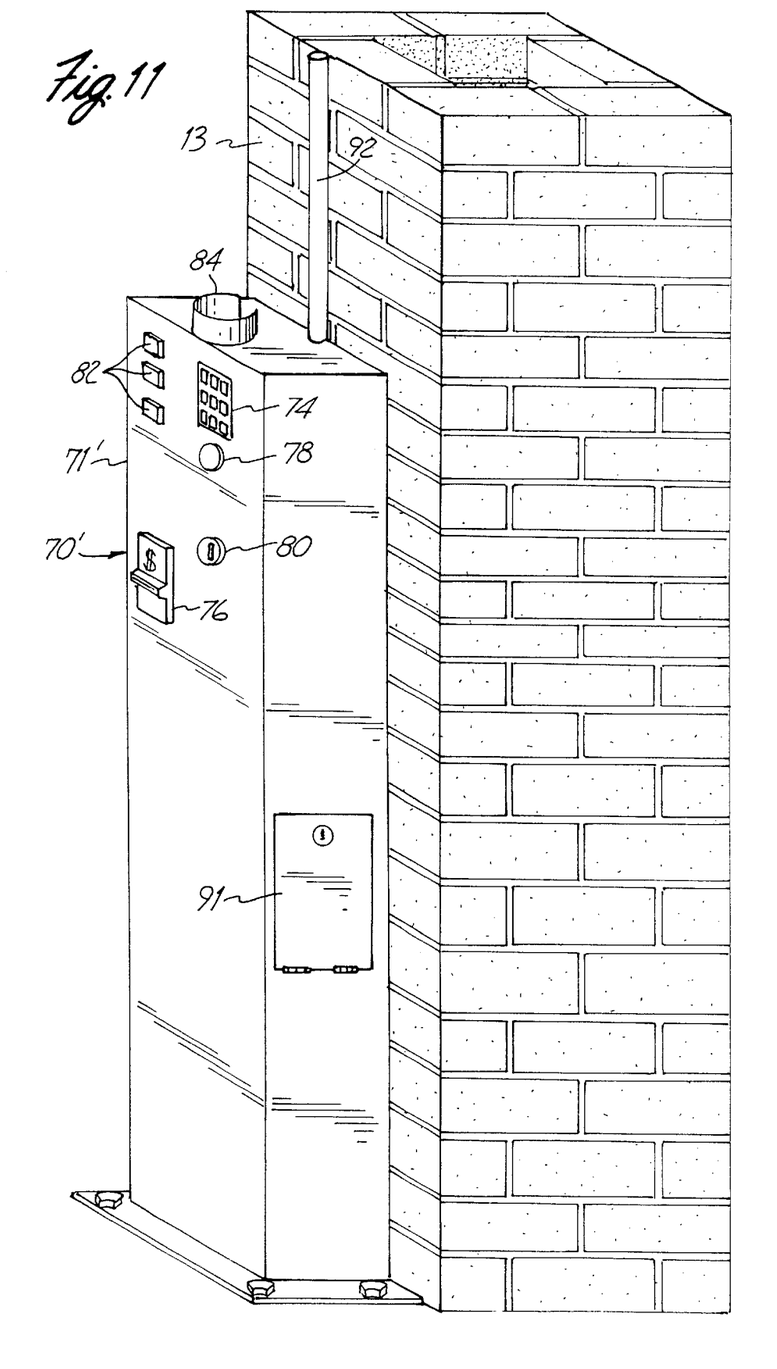
FIG. 11 is a broken-away perspective view of an alternate embodiment of a vending control unit of the invention.

FIG. 11 illustrates further details of a modified version of a vending control unit 70' of the type usable in the embodiment of FIG. 10, or in other installations where conventional attachment of the vending control unit to the canopy column is not convenient. Such a situation occurs, e.g., when the canopy column is made from brick (or has a brick facade), as shown in FIG. 11, or is otherwise constructed with materials, or in a configuration, such that direct mounting of the vending control unit to the column is undesirable. The unit shown in FIG. 11 is a pedestal type, being mounted to the concrete pad adjacent to the column 13 (or, in the case of FIG. 10, adjacent to the fluid storage tank 68). Access to the internal cash vault may be provided through an access door 91, or through other suitable means. Such an access door 91 may also provide access to a pump 67', such as is utilized in the embodiment of the invention shown in FIG. 10. A conventional electrical conduit 92 may be run upwardly along the outer surface of the column 13 for connecting the system controller 72 within the vending control unit 70' to a power source and to other components within the fluid dispensing system. If desired, the conduit 92 may covered by an aesthetically pleasing cover of some type, or it may be routed into and up the center of the column 13.

Figure 12:
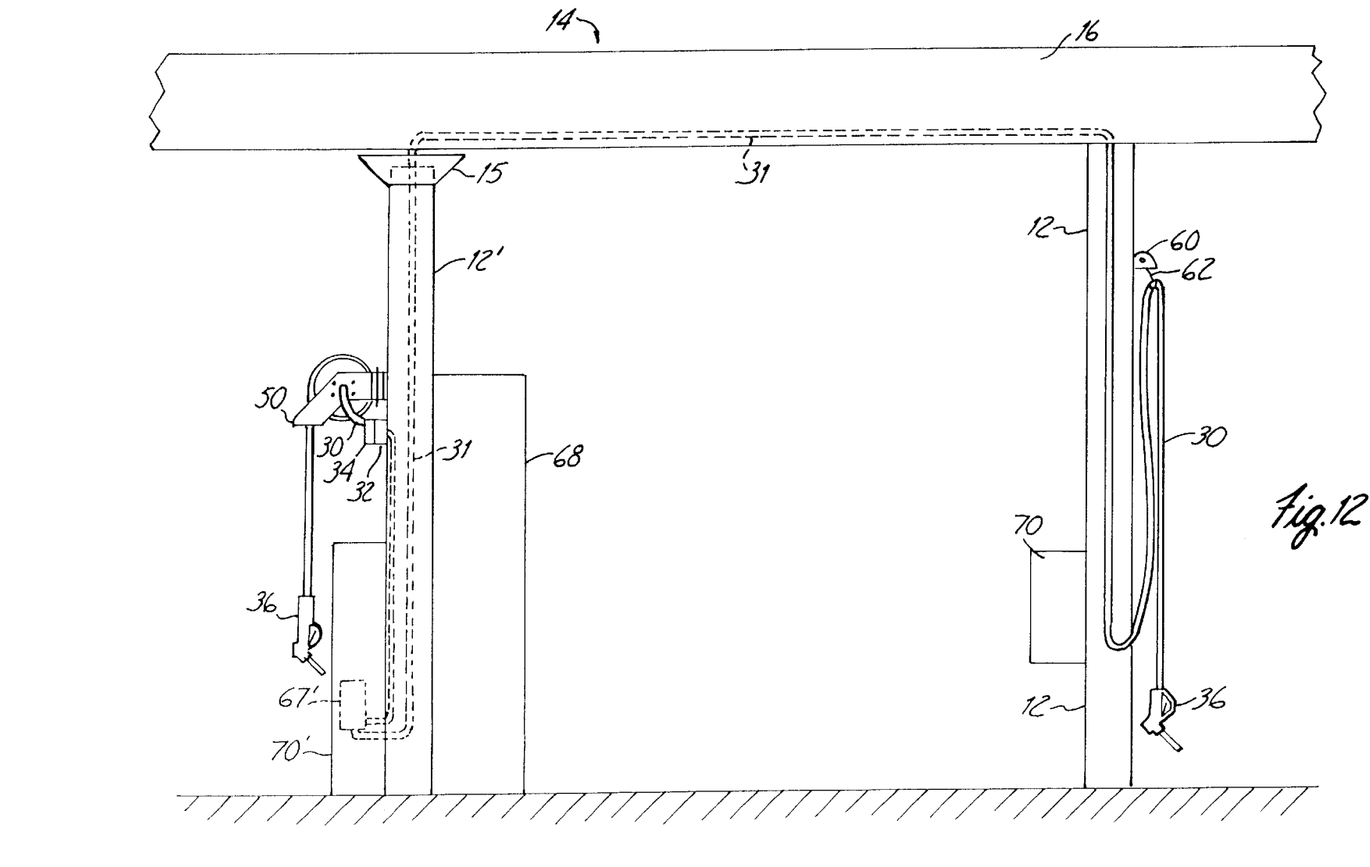
FIG. 12 is an elevation view of yet another alternate embodiment of the windshield washer fluid dispensing system of the invention.

FIG. 12 illustrates another embodiment similar in many respects to the embodiment of FIG. 10. In FIG. 12, the column 12' on the left side of the drawing is not a regular support column of the canopy 14. Rather, the column 12' is secured to the ground (usually a concrete pad), and extends upwardly to a position very close to the canopy 14 (which is typically about 12–15 feet above the ground) to provide the aesthetic appearance of a support column. Preferably slight clearance between the column 12' and the canopy 14 is provided to permit relative movement of the canopy 14 with respect to the column 12' (e.g., slight movement of the canopy in the wind). If desired, an aesthetic flange 15 (made, e.g., from rubber, which can abut the canopy without causing damage to it) may be provided to mask the junction of the column 12' with the canopy. The fluid storage tank 68, hose reel 50 and vending control unit 70' are all secured to the column 12'. Such an installation is useful in settings where there is a desirable location under the canopy 14 for a windshield washer fluid dispensing system of the invention but there is not support column 12 at such location. Such a column 12' may be utilized not only with the particular fluid storage system and vending control units of FIG. 12 but also with any of the other embodiments described in the present application. Moreover, such a column 12' may be utilized with a stand-alone fluid dispensing system having just a single hose 30 and a single vending control unit 70'—in such a configuration, the column 12' is nevertheless utilized as a pathway for bringing electrical power down from the canopy to the vending control unit 70'.

Figure 13:
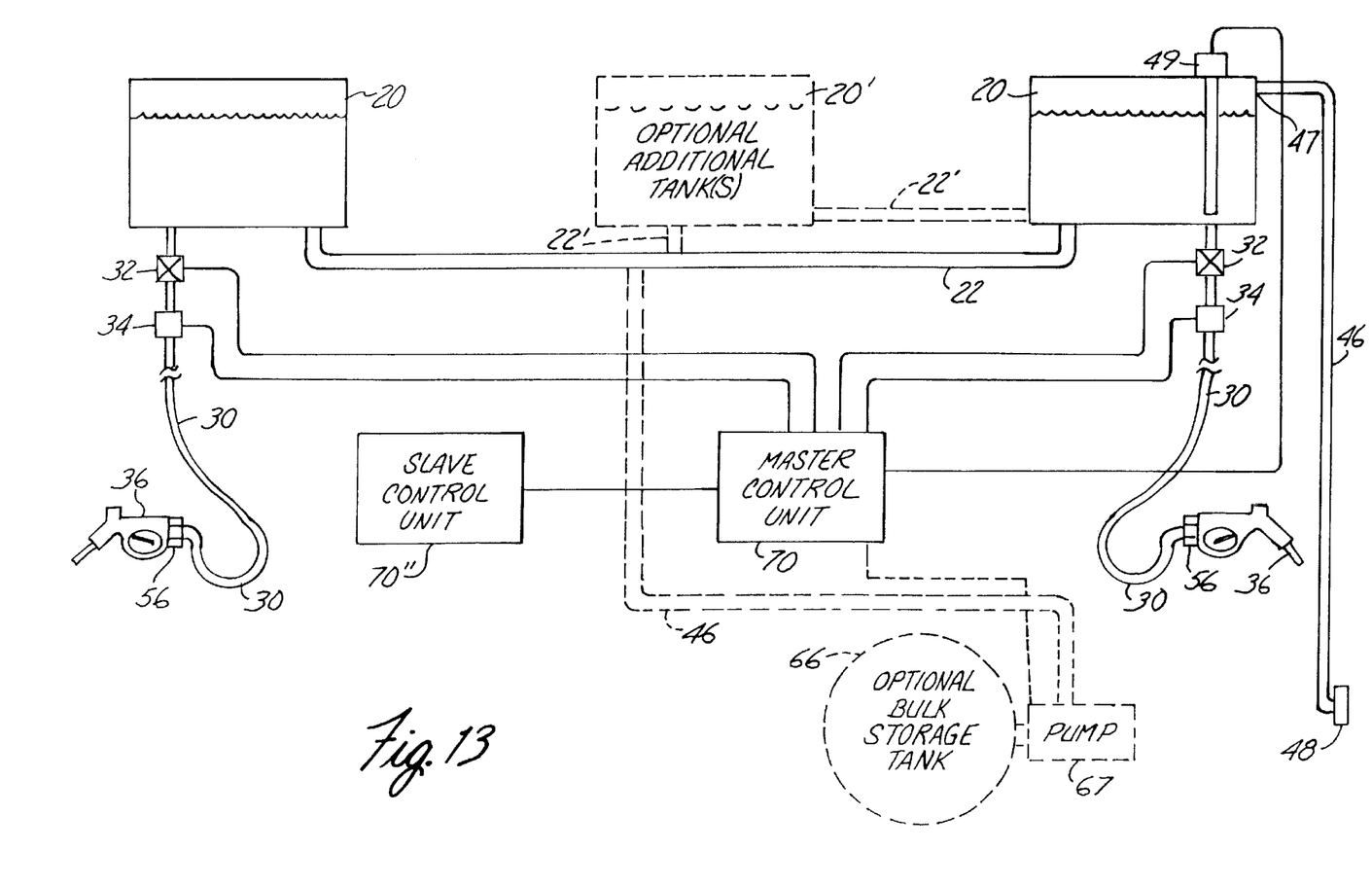
FIG. 13 is a schematic illustration of the relationships of the various components in a windshield washer fluid dispensing system of the invention.

FIG. 13 illustrates in somewhat schematic fashion the electronic connections of a master control unit 70 with a slave control unit 70" (typically mounted on separate canopy columns), as well as the connections to the flow meters 32, solenoids 34 and the tank fluid level sensor 49. This illustration also depicts optional additional tanks 20' with the optional equalization conduits 22' connecting such tanks 20' either in daisy chain style or manifold style to the fluid tanks 20. Moreover, the optional bulk storage tank 66 (described above) is also illustrated, with its optional fluid connections 46 to the fluid tanks 20 and 20'.

In use, a customer deposits the required amount of money in one of the vending control units. The system controller detects the deposit of the money and the customer's option selection (through buttons 82), and activates the controllable dispensing valve (i.e., typically a solenoid or similar valve) 34. The customer then uses the dispensing nozzle 36 to dispense the windshield washer fluid into the windshield washer fluid tank in his or her vehicle. Sale information may be collected and maintained by the system controller 72, along with information about fluid levels in the fluid storage tanks. In systems so equipped, this information may be routinely downloaded through conventional communications links (land lines, cellular or satellite connections, etc.) to a headquarters location, which can then utilize this information to dispatch refill trucks and/or repair crews. The fluid equalization conduits connecting multiple tanks in the system assure that all vending stations are capable of dispensing fluid so long as any fluid remains in the fluid storage system. Similarly, all such tanks can be refilled from a single fluid supply conduit 46, alleviating the need to individually fill multiple tanks. If the optional bulk storage tank is utilized, automated refilling of the elevated fluid storage tanks can be easily accomplished, further reducing the number of refill trips required to keep the system stocked and operational.

While a preferred embodiment of the present invention has been described, it should be understood that various changes, adaptations and modifications may be made therein without departing from the spirit of the invention and the scope of the appended claims.

What is claimed is:

1. A system for dispensing automotive fluid, comprising:
   two or more vending control units;
   one or more fluid conduits;
   a fluid storage system comprising two or more elevated fluid storage tanks each tank in fluid communication with at least one other tank via fluid conduits, the one or more fluid conduits permitting distribution of fluid between the storage tanks so that fluid levels in the storage tanks tend to equalize as fluid is added to or withdrawn from any one of the tanks; and
   a fluid dispensing hose associated with and controlled by each vending control unit, each fluid dispensing hose having a proximal end connected to the fluid storage system and a distal end positioned relatively lower than the elevated fluid storage tanks and from which fluid may be dispensed by force of gravity in response to selective activation of the corresponding vending control unit by a user.

2. The system of claim 1 wherein the automotive fluid is windshield washer fluid.

3. The system of claim 1 wherein the automotive fluid is radiator coolant.

4. The system of claim 1 wherein the automotive fluid is oil.

5. The system of claim 1 further comprising an overhead canopy including a roof portion and two or more columns supporting the roof portion, the fluid storage tanks being mounted to the canopy.

6. The system of claim 5 wherein at least one of the fluid storage tanks is mounted on the roof portion of the canopy.

7. The system of claim 5 wherein at least one of the fluid storage tanks is mounted on the roof portion of the canopy at a location above one of the support columns.

8. The system of claim 5 wherein at least one of the fluid storage tanks is mounted to one of the canopy columns at a position below the canopy roof portion.

9. The system of claim 8 wherein fluid storage tanks are mounted to at least two of the columns of the canopy.

10. The system of claim 8 wherein the vending control units are mounted to the columns at a level below the storage tanks.

11. The system of claim 5 wherein at least one of the vending control units is mounted to one of the columns.

12. The system of claim 1 wherein the fluid storage system includes first, second and third fluid storage tanks, the one or more fluid conduits including a first conduit connecting the first fluid storage tank to the second fluid storage tank, and a second conduit connecting the second fluid storage tank to the third fluid storage tank.

13. The system of claim 1 wherein the fluid storage system includes three fluid storage tanks, the one or more fluid equalization conduits including a manifold and three individual conduits respectively connecting the fluid storage tanks to the manifold.

14. The system of claim 1 wherein at least one of the fluid dispensing hoses is connected to one of the fluid storage tanks.

15. The system of claim 1 wherein each fluid dispensing hose is connected to one of the fluid storage tanks.

16. The system of claim 1 wherein at least one of the fluid dispensing hoses is connected to one of the fluid equalization conduits.

17. The system of claim 1 wherein each fluid dispensing hose is connected to one of the fluid equalization conduits.

18. The system of claim 1 wherein each tank has a capacity of at least about 50 gallons.

19. The system of claim 1 wherein each tank has a capacity of at least about 100 gallons.

20. The system of claim 1 wherein the fluid storage system further comprises:
   a bulk storage tank positioned at a level below the elevated fluid storage tanks;
   a supply conduit connecting the bulk storage tank to at least one of the elevated storage tanks, optionally through a portion of one of the fluid conduits; and
   a pump disposed in the supply conduit for pumping windshield washer fluid from the bulk storage tank to the elevated storage tanks.

21. The system of claim 1 wherein the fluid storage system further comprises a supply conduit having a first end connected to one of the elevated fluid storage tanks and a second end accessible at ground level for connection to a supply tank.

22. The system of claim 21 wherein the second end of the supply conduit includes a quick connect fitting with a check valve.

23. The system of claim 21 further comprising a fluid level sensor mounted in at least one of the elevated fluid storage tanks.

24. A system for dispensing automotive fluid, comprising:
   one or more vending control units;
   one or more fluid conduits;
   a fluid storage system comprising two or more elevated fluid storage tanks, each tank in fluid communication with at least one other tank via fluid conduits, the one or more fluid conduits distributing fluid between the storage tanks so that fluid levels in the storage tanks tend to equalize as fluid is added to or withdrawn from any one of the tanks; and a fluid dispensing hose associated with and controlled by each vending control unit, each fluid dispensing hose having a proximal end connected to the fluid storage system and a distal end positioned relatively lower than the elevated fluid storage tanks and from which fluid may be dispensed by force of gravity in response to selective activation of the corresponding vending control unit by a user.

* * * * *